US010369765B2

(12) United States Patent
Konaka et al.

(10) Patent No.: US 10,369,765 B2
(45) Date of Patent: Aug. 6, 2019

(54) FASTENER TAPE, SLIDE FASTENER PROVIDED WITH SAME, AND FASTENER TAPE FABRICATION METHOD

(75) Inventors: Toshimasa Konaka, Toyama (JP); Shinyo Yokoyama, Toyama (JP); Jun Hamada, Toyama (JP)

(73) Assignee: YKK Corporation (JP)

( * ) Notice: Subject to any disclaimer, the term of this patent is extended or adjusted under 35 U.S.C. 154(b) by 309 days.

(21) Appl. No.: 14/413,740

(22) PCT Filed: Jul. 9, 2012

(86) PCT No.: PCT/JP2012/067499
§ 371 (c)(1),
(2), (4) Date: Jan. 22, 2015

(87) PCT Pub. No.: WO2014/010019
PCT Pub. Date: Jan. 16, 2014

(65) Prior Publication Data
US 2015/0143672 A1 May 28, 2015

(51) Int. Cl.
*A44B 19/32* (2006.01)
*B32B 5/02* (2006.01)
(Continued)

(52) U.S. Cl.
CPC ............... *B32B 5/02* (2013.01); *A44B 19/32* (2013.01); *A44B 19/34* (2013.01); *B32B 7/12* (2013.01);
(Continued)

(58) Field of Classification Search
CPC ......... A44B 19/24; A44B 19/04; A44B 19/32; A44B 19/34; Y10T 24/2527; Y10T 24/2523; Y10T 24/2518; Y10T 24/2514
See application file for complete search history.

(56) References Cited

U.S. PATENT DOCUMENTS 3,490,109 A * 1/1970 Heimberger ........... A44B 19/32
24/389
3,490,970 A * 1/1970 Heimberger ........... A44B 19/36
156/196
(Continued)

FOREIGN PATENT DOCUMENTS

DE          2402799 C3    11/1978
JP      2000-312604 A    11/2000
(Continued)

OTHER PUBLICATIONS

International Preliminary Report on Patentabiliy, PCT Application No. PCT/JP2012/067499, dated Jan. 22, 2015.
(Continued)

*Primary Examiner* — Jason W San
(74) *Attorney, Agent, or Firm* — Kilpatrick Townsend & Stockton LLP

(57) ABSTRACT

A water-proof fastener tape of an environment-conscious type fabricated using a reduced amount of an organic solvent is provided. The fastener tape includes a base fabric and a water-stop film laminated to at least one surface of the base fabric, the water-stop film includes a surface layer of a polyurethane film and an adhesive layer of a cured product of an aqueous polyurethane adhesive adjacent to the surface layer so that the fastener tape has a laminate structure.

6 Claims, 5 Drawing Sheets

(51) Int. Cl.
   *A44B 19/34*   (2006.01)
   *B32B 7/12*    (2006.01)
   *B32B 27/40*   (2006.01)
   *B32B 37/12*   (2006.01)
   *C09J 5/00*    (2006.01)

(52) U.S. Cl.
   CPC .............. *B32B 27/40* (2013.01); *B32B 37/12* (2013.01); *C09J 5/00* (2013.01); *B32B 2307/7265* (2013.01); *Y10T 24/25* (2015.01); *Y10T 428/249921* (2015.04)

(56) References Cited

U.S. PATENT DOCUMENTS

| | | | | |
|---|---|---|---|---|
| 3,591,914 A * | 7/1971 | Heimberger | ........... | A44B 19/26 264/320 |
| 3,639,147 A * | 2/1972 | Benefiel | ........... | B05D 7/534 427/389.7 |
| 3,668,745 A * | 6/1972 | Krupp | ........... | A44B 19/32 24/389 |
| 3,914,827 A * | 10/1975 | Brown | ........... | A44B 19/32 24/389 |
| 4,116,741 A * | 9/1978 | Thoma | ........... | C08G 18/66 156/239 |
| 4,276,341 A * | 6/1981 | Tanaka | ........... | A41D 31/0038 2/2.16 |
| 4,307,004 A * | 12/1981 | Schuhmacher | ........... | C08G 18/0866 156/277 |
| 4,601,085 A * | 7/1986 | Yoshida | ........... | A44B 19/32 24/384 |
| 4,651,389 A * | 3/1987 | Yoshida | ........... | A41H 37/003 24/398 |
| 4,724,586 A * | 2/1988 | Tsubokawa | ........... | A44B 19/32 24/384 |
| 4,770,917 A * | 9/1988 | Tochacek | ........... | A44B 18/0003 156/72 |
| 4,861,826 A * | 8/1989 | Hummerich | ........... | C08G 18/0804 524/839 |
| 4,920,192 A * | 4/1990 | Wiser-Halladay | ........... | C08G 18/0852 166/281 |
| 5,232,755 A * | 8/1993 | Komiya | ........... | B32B 27/06 428/347 |
| 5,298,303 A * | 3/1994 | Kerr | ........... | C08G 18/12 206/524.2 |
| 5,389,718 A * | 2/1995 | Potter | ........... | C08G 18/0819 524/591 |
| 5,728,460 A * | 3/1998 | Hirasawa | ........... | A44B 19/34 156/220 |
| 5,861,470 A * | 1/1999 | Voss | ........... | B32B 7/12 156/331.4 |
| 5,985,438 A * | 11/1999 | Watanabe | ........... | A44B 19/34 29/33.2 |
| 6,093,489 A * | 7/2000 | Watanabe | ........... | A44B 19/34 428/216 |
| 6,105,214 A * | 8/2000 | Press | ........... | A44B 19/32 24/384 |
| 6,343,408 B1 * | 2/2002 | Neugebauer | ........... | A44B 19/32 24/389 |
| 6,427,294 B1 * | 8/2002 | Shibaike | ........... | A44B 19/32 24/381 |
| 7,386,893 B2 * | 6/2008 | Chang | ........... | A41D 3/00 2/87 |
| 7,928,161 B2 * | 4/2011 | Bhattacharjee | ........... | C08G 18/0866 524/837 |
| 8,166,619 B2 * | 5/2012 | Cossutti | ........... | A44B 19/32 24/389 |
| 8,293,830 B2 * | 10/2012 | Clarke | ........... | B32B 27/04 427/554 |
| 8,304,059 B2 * | 11/2012 | Nishimaki | ........... | B32B 27/40 428/190 |
| 8,327,509 B2 * | 12/2012 | Kusayama | ........... | A44B 19/32 24/389 |
| 8,765,263 B2 * | 7/2014 | Ho | ........... | B32B 7/12 428/412 |
| 9,097,018 B2 * | 8/2015 | Jendoubi | ........... | B32B 27/08 |
| 9,301,579 B2 * | 4/2016 | Fujii | ........... | A44B 19/32 |
| 2002/0076551 A1 * | 6/2002 | Watanabe | ........... | A44B 19/34 428/354 |
| 2003/0149166 A1 * | 8/2003 | Duffy | ........... | C08J 3/03 524/588 |
| 2004/0237266 A1 * | 12/2004 | Wang | ........... | A44B 19/32 24/389 |
| 2005/0235466 A1 * | 10/2005 | Segawa | ........... | A44B 19/34 24/396 |
| 2006/0154009 A1 * | 7/2006 | Julien | ........... | B32B 1/02 428/35.7 |
| 2006/0282995 A1 * | 12/2006 | Liou | ........... | A44B 19/32 24/389 |
| 2007/0094852 A1 * | 5/2007 | Wang | ........... | A44B 19/32 24/389 |
| 2008/0189918 A1 * | 8/2008 | Kusayama | ........... | A44B 19/32 24/389 |
| 2009/0235972 A1 * | 9/2009 | Fukushima | ........... | H01L 31/0512 136/244 |
| 2010/0005557 A1 * | 1/2010 | Cossutti | ........... | A44B 19/32 2/2.17 |
| 2010/0125982 A1 * | 5/2010 | Chou | ........... | A44B 19/32 24/397 |
| 2011/0070409 A1 * | 3/2011 | Nishimaki | ........... | B32B 27/40 428/190 |
| 2013/0014355 A1 * | 1/2013 | Lee | ........... | A44B 19/32 24/389 |
| 2013/0089721 A1 * | 4/2013 | Paolilli | ........... | C09D 133/12 428/216 |
| 2013/0136913 A1 * | 5/2013 | Chiyonobu | ........... | C08G 18/0823 428/221 |
| 2013/0333166 A1 * | 12/2013 | Shimono | ........... | A44B 19/24 24/435 |
| 2014/0068899 A1 * | 3/2014 | Kojima | ........... | A44B 19/26 24/399 |
| 2014/0130974 A1 * | 5/2014 | Chen | ........... | A44B 19/42 156/270 |
| 2014/0304954 A1 * | 10/2014 | La Rocca | ........... | A44B 19/08 24/389 |
| 2014/0359979 A1 * | 12/2014 | Gonda | ........... | A44B 19/32 24/415 |
| 2014/0366337 A1 * | 12/2014 | Chou | ........... | A44B 19/24 24/389 |
| 2015/0037596 A1 * | 2/2015 | Takamori | ........... | C09J 123/0892 428/446 |
| 2015/0157096 A1 * | 6/2015 | Mikuma | ........... | A44B 19/32 24/389 |
| 2015/0321452 A1 * | 11/2015 | Egashira | ........... | B32B 27/32 428/215 |
| 2016/0053148 A1 * | 2/2016 | Tsuchida | ........... | C09J 183/04 524/588 |
| 2016/0144599 A1 * | 5/2016 | Ogyu | ........... | C09J 7/0242 428/355 N |
| 2016/0255890 A1 * | 9/2016 | Wangbunyen | ........... | A41D 27/245 |
| 2016/0333155 A1 * | 11/2016 | Bai | ........... | C08G 18/4236 |

FOREIGN PATENT DOCUMENTS

| | | |
|---|---|---|
| JP | 2002-525143 A | 8/2002 |
| JP | 2007-92195 A | 4/2007 |
| JP | 2008-156488 A | 7/2008 |
| JP | 2009-90108 A | 4/2009 |
| JP | 2012-72350 A | 4/2012 |

OTHER PUBLICATIONS

International Search Report, PCT Application No. PCT/JP2012/067499, dated Sep. 18, 2012.

(56) References Cited

OTHER PUBLICATIONS

Office Action, German Patent Application No. 11 2012 006 678.2, dated Aug. 20, 2018.

\* cited by examiner

FASTENER TAPE, SLIDE FASTENER PROVIDED WITH SAME, AND FASTENER TAPE FABRICATION METHOD This application is a national stage application of PCT/JP2012/067499, which is incorporated herein by reference.

TECHNICAL FIELD

The present invention relates to a waterproof fastener tape. The present invention also relates to a slide fastener comprising a waterproof fastener tape. The present invention also relates to a method for fabricating a waterproof fastener tape.

BACKGROUND ART

Slide fasteners are widespread as an opening and closing device for daily necessities such as clothing, bags, shoes and general merchandise, but apart from that, are also used in protective clothing such as space suits, chemical protective clothing, diving suits and survival suits, covers for transportation containers and tents. For such special uses, waterproofing property is required even for the slide fasteners.

Generally, a slide fastener is mainly composed of three parts: a pair of long fastener tapes, fastener elements sewn along one side edge of each tape, which are engaging parts of the fastener, and a slider to control opening and closing of the fastener by engaging and separating the fastener elements. Heretofore, there has been known a slide fastener in which a waterproof synthetic resin film is laminated to the fastener tapes for imparting waterproof property, and the synthetic resin films on the bilateral fastener tapes are brought into close contact with each other to exert waterproof property during engagement.

Japanese Patent Laid-Open No. 2000-312604, for example, describes that a laminated synthetic resin film composed of a low melting point-resin layer and a high melting point-resin layer is welded to at least one surface of the fastener tape in the slide fastener in a way that the low melting point-resin layer is in face-to-face contact with the fastener tape surface. As the materials for the laminated synthetic resin film, a urethane-based resin and a polyester-based resin are disclosed.

CITATION LIST

Patent Literature

Patent Literature 1: Japanese Patent Laid-Open No. 2000-312604

SUMMARY OF INVENTION

Technical Problem

In recent years, fabrication of products has been required to take the environmental burden and workers' health associated with organic solvents into consideration. Thus, it is desirable that a waterproof slide fastener be also shifted to that of an environment-conscious type fabricated using a reduced amount of an organic solvent. However, a waterproof fastener tape of an environment-conscious type has not yet been provided in the world.

Accordingly, one of the subject of the present invention is to provide a waterproof fastener tape of an environment-conscious type fabricated using a reduced amount of an organic solvent. Another subject of the present invention is to provide a slide fastener comprising such a waterproof fastener tape. Further, another subject of the present invention is to provide a method for fabricating such a waterproof fastener tape.

Solution to Problem

The present inventors have intensively studied in order to solve the subjects described above, and consequently found that the water-stop film described below using an aqueous polyurethane is effective.

In one aspect, the present invention is a fastener tape comprising a base fabric and a water-stop film laminated to at least one surface of the base fabric, the water-stop film comprising a surface layer composed of a polyurethane film and an adhesive layer composed of a cured product of an aqueous polyurethane adhesive adjacent to the surface layer so that the fastener tape has a laminate structure.

In an embodiment of the fastener tape according to the present invention, both the polyurethane of the surface layer and the aqueous polyurethane of the adhesive layer are a polycarbonate-based polyurethane.

In another embodiment of the fastener tape according to the present invention, the cured product of the aqueous polyurethane adhesive comprises a carboxyl group and/or a neutralized carboxyl group.

In still another embodiment of the fastener tape according to the present invention, the surface layer is composed of a film of an organic solvent-borne polyurethane.

In yet another embodiment of the fastener tape according to the present invention, the solvent in the organic solvent-borne polyurethane is a quasi-aqueous solvent.

In yet another embodiment of the fastener tape according to the present invention, the surface layer comprises a silicone compound.

In yet another embodiment of the fastener tape according to the present invention, the content of the silicone compound in the surface layer is 2% or more by mass and 25% or less by mass.

In yet another embodiment of the fastener tape according to the present invention, the content of the silicone compound in the surface layer is 4% or more by mass and 15% or less by mass.

In another aspect, the present invention is a slide fastener comprising the fastener tape according to the present invention.

In still another aspect, the present invention is a method for fabricating a fastener tape, the method comprising the steps of:

laminating a surface layer composed of a polyurethane film and a base fabric via an aqueous polyurethane adhesive; and curing the aqueous polyurethane adhesive between the surface layer and the base fabric.

In an embodiment of the method for fabricating a fastener tape according to the present invention, the film composing the surface layer is a film of an organic solvent-borne polyurethane.

In another embodiment of the method for fabricating a fastener tape according to the present invention, the solvent in the organic solvent-borne polyurethane is a quasi-aqueous solvent.

Advantageous Effect of Invention

The water-stop film used in the present invention is an environmentally friendly water-stop film fabricated using a reduced amount of an organic solvent, and thus is suitable for the water-stop film for the fastener tape of the environment-conscious type. Therefore, there is provided a fastener tape having both waterproof performance and environmental performance by the present invention.

DESCRIPTION OF EMBODIMENTS

Figure 1:
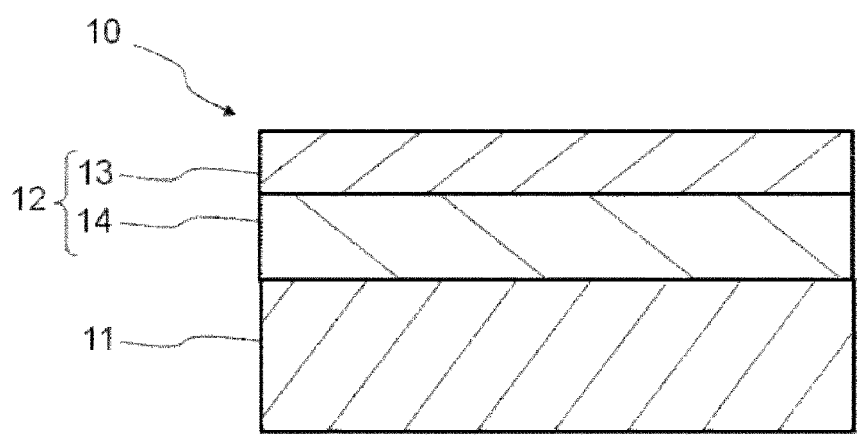
FIG. 1 is a schematic diagram showing a laminate structure of a fastener tape for a slide fastener according to an embodiment of the present invention.

FIG. 1 shows a laminate structure of a fastener tape of a slide fastener according to an embodiment of the present invention. A fastener tape 10 comprises a base fabric 11 and a water-stop film 12 laminated to at least one surface of the base fabric 11. The water-stop film 12 comprises a surface layer 13 composed of a film of an organic solvent-borne polyurethane and an adhesive layer 14 composed of a cured product of an aqueous polyurethane adhesive adjacent to the surface layer 13. That is, the fastener tape 10 comprises the adhesive layer 14 on the base fabric 11 side of the surface layer 13, and the base fabric 11 and the surface layer 13 are adhered to each other via the adhesive layer 14 between the both two. Thus, as shown in FIG. 1, the fastener tape 10 has the laminate structure in which the surface layer 13, the adhesive layer 14, and the base fabric 11 are laminated in this order from the upper side of the paper surface in the sectional view.

(1. Base Fabric)

The material for the base fabric 11 can be natural or synthetic fibers commonly used for the fastener tapes, and includes, but is not particularly limited to, polyamide fibers, polyester fibers, and acrylic fibers, for example. The base fabric 11 can be fabricated by weaving or knitting these synthetic fibers. Typically, the base fabric 11 can be fabricated by weaving or knitting polyester fibers.

Here is described an example of a procedure to adhere the water-stop film 12 to the base fabric 11. The cured product for the surface layer 13 of the water-stop film 12 is provided, and then an adhesive is applied to the surface thereof and dried. The water-stop film 12 is then stacked on at least one surface of the base fabric 11 with the adhesive layer 14 side (adhesive-applied side) of the water-stop film 12 being the adhesive surface, and in that state, the stacked materials are heated and pressurized, so that the water-stop film 12 is laminated to the base fabric 11 (step of laminating the surface layer 13 and the base fabric 11) (temporarily adhering state). Subsequently, an accelerated curing reaction is performed under the conditions of, for example, curing temperature 40-60° C. for 48 hours or more to cure the curing agent (step of curing the adhesive), whereby the base fabric 11 and the water-stop film 12 are firmly bonded. In this way, the fastener tape having waterproof performance 10 can be obtained. The adhesive may be applied to the base fabric 11 side.

(2. Adhesive Layer)

The adhesive layer 14 is formed of a cured product of an aqueous polyurethane adhesive, preferably that being three-dimensionally crosslinked. The aqueous polyurethane adhesive suitably includes an aqueous polyurethane, an isocyanate compound as a curing agent and water as a dispersant. A thickener can be also added for viscosity adjustment. The aqueous polyurethane is typically particulate and provided in the form of, for example, a polyurethane emulsion or a polyurethane dispersion. It is noted that by "aqueous" is meant herein that water is used as a dispersion medium.

With regard to the aqueous polyurethane used as the base resin, any of those known to a person skilled in the art can be used, and what is preferred is polyether-based, polyester-based, polycarbonate-based or polycaprolactone-based polyurethanes having a hydrophilic group. Of these, polycarbonate-based polyurethanes having a hydrophilic group are more preferred because of hydrolysis resistance, heat resistance, oil resistance and wear resistance. Cationic, anionic or nonionic hydrophilic groups are contemplated as the hydrophilic group, and these groups may be used singly or in combination. The cationic groups include, for example, an amino group. The anionic hydrophilic groups include, for example, a carboxyl group, a phosphonic acid group and a sulfonic acid group. The nonionic hydrophilic groups include, for example, polyalkylene oxide groups (e.g., a polyethylene oxide group) and a hydroxyl group. Among these hydrophilic groups, a carboxyl group is preferred because of reduction of the environmental burden. Desirably, the anionic hydrophilic group, such as a carboxyl group, has been neutralized with a base, such as triethylamine, ammonia or 2-amino-2-methylpropanol in terms of enhancing hydrophilicity of the polyurethane.

The isocyanate compound used as the curing agent can include an aliphatic isocyanate, an alicyclic isocyanate, an aromatic isocyanate or a combination thereof. The isocyanate can be selected from, for example, dimers, trimers, isocyanate derivatives, isocyanate prepolymers and block isocyanates. Aromatic isocyanates tend to cause yellowing, while aliphatic isocyanates, alicyclic isocyanates or combinations thereof have excellent discoloration resistance, thereby having a long pot life (also referred to as a working life and referring to a period of time before the viscosity or other conditions make the adhesive unusable after mixing a curing agent, a catalyst and the like therein), and therefore, the latters are preferred. The aliphatic isocyanates include, for example, ethylene diisocyanate, tetramethylene diisocyanate, hexamethylene diisocyanate, dodecamethylene diisocyanate, 2,2,4-trimethylhexane diisocyanate, lysine diisocyanate, 2,6-diisocyanatomethyl caproate, isophorone diisocyanate, 1,4-cyclohexane diisocyanate, 4,4'-dicyclohexylmethane diisocyanate, bis(isocyanatomethyl)cyclohexane, cyclohexylene diisocyanate and methylcyclohexylene diisocyanate.

The form of the isocyanate compound (curing agent) suitable for use in the aqueous polyurethane adhesive is not particularly limited, but that in which the isocyanate compound is dissolved in a quasi-aqueous solvent is suitably used. A quasi-aqueous solvent refers to a water-soluble organic solvent. The quasi-aqueous solvent includes, for example, glycol ethers (diethyleneglycol dimethyl ether, propyleneglycol monomethyl ether, methoxymethylbutanol, etc.), alcohols (ethanol, isopropanol, etc.), terpenes (d-limonene) and pyrrolidones (N-methyl-2-pyrrolidone), and among others, glycol ethers, in which the hydrocarbon has a hydrophobic nature and the hydroxyl group and the ether group have a hydrophilic nature, are preferred in terms of homogeneous dispersion due to good compatibility with water contained in the aqueous polyurethane used as the base resin.

As the thickener, any known water-soluble thickeners can be used, and the thickener includes, for example, naturally occurring polymers such as polysaccharides and gelatin, synthetic polymers such as polyoxyethylene and crosslinked poly(meth)acrylic acid, and inorganic minerals such as montmorillonite and silica.

In the aqueous polyurethane adhesive, vaporization of the solvent and the reaction between the base resin and the curing agent occur during curing, and the finally resulting adhesive layer 14 is mainly composed of the crosslinked polyurethane formed by the curing reaction between the base resin and the curing agent and the solid in the thickener. In the adhesive layer 14, preferably the mass ratio of the curing agent to the base resin (in terms of solid) is 10 or more, and more preferably 12 or more, since the too little curing agent results in insufficient adhesive strength. However, the mass ratio of the curing agent to the base resin (in terms of solid) is preferably 25 or less, and more preferably 23 or less, since the excessive curing agent results in too high stiffness to deteriorate the texture of the fastener tape after lamination.

Preferably, the thickness of the adhesive layer 14 is 0.02 mm or more, since the too thin adhesive layer deteriorates the texture. On the other hand, preferably, the thickness of the adhesive layer 14 is 0.2 mm or less, since the excessively thick adhesive layer causes sliding contact with the slider upon opening and closing of the slide fastener to deteriorate slidability thereof.

(3. Surface Layer)

The surface layer 13 can be formed of a film of an aqueous polyurethane or an organic solvent-borne polyurethane. The film of an aqueous polyurethane can be obtained by drying a liquid in which an aqueous polyurethane is dispersed in water, typically a liquid in which a particulate aqueous polyurethane is dispersed in water. The film of an organic solvent-borne polyurethane can be obtained by drying a solution in which a polyurethane is dissolved in an organic solvent. In addition, for both the aqueous polyurethane and the organic solvent-borne polyurethane, a curing agent may be added in a liquid in which a polyurethane is dispersed in water or dissolved in an organic solvent to cause a curing reaction. Addition of the curing agent can provide enhanced film strength.

As the above-described polyurethane, any of those known to a person skilled in the art can be used, and the polyurethane includes, for example, polyether-based polyurethanes, polyester-based polyurethanes, polycarbonate-based polyurethanes and polycaprolactone-based polyurethanes. Of these, polycarbonate-based polyurethanes are preferred because of strength of the film itself.

As the curing agent, the same isocyanate compounds as those described for the aqueous polyurethane adhesive can be suitably used.

The organic solvent used for the organic solvent-borne polyurethane is not particularly limited, but the quasi-aqueous solvents as described above are suitably used, while it is preferred not to use DMF (N,N-dimethylformamide) for reducing the environmental burden. Although use of water is rather preferred in terms of the environmental burden, use of the quasi-aqueous solvent is the most preferred, comprehensively considering the matters including the adhesive strength when laminated on the fabric of the article via an adhesive and the durability against sliding of the slider.

Preferably, the surface layer 13 contains a silicone compound in order to prevent the damage due to the sliding with the slider. Preferably, the silicone compound accounts for 2% or more by mass in the surface layer 13 (in terms of solid), and more preferably 4% or more by mass in order to effectively exert the durability against the sliding. However, the silicone compound preferably accounts for 25% or less by mass, and more preferably 15% or less by mass in the surface layer 13 since the excessive content of the silicone compound may rather embrittle the surface layer in some cases. It is preferred that at least a part of the silicone compound be present in the form of a copolymer with the polyurethane composing the surface layer in terms of enhancing the wear resistance (fastener durability against reciprocating opening and closing).

(4. Embodiments of the Slide Fastener)

Figure 2:
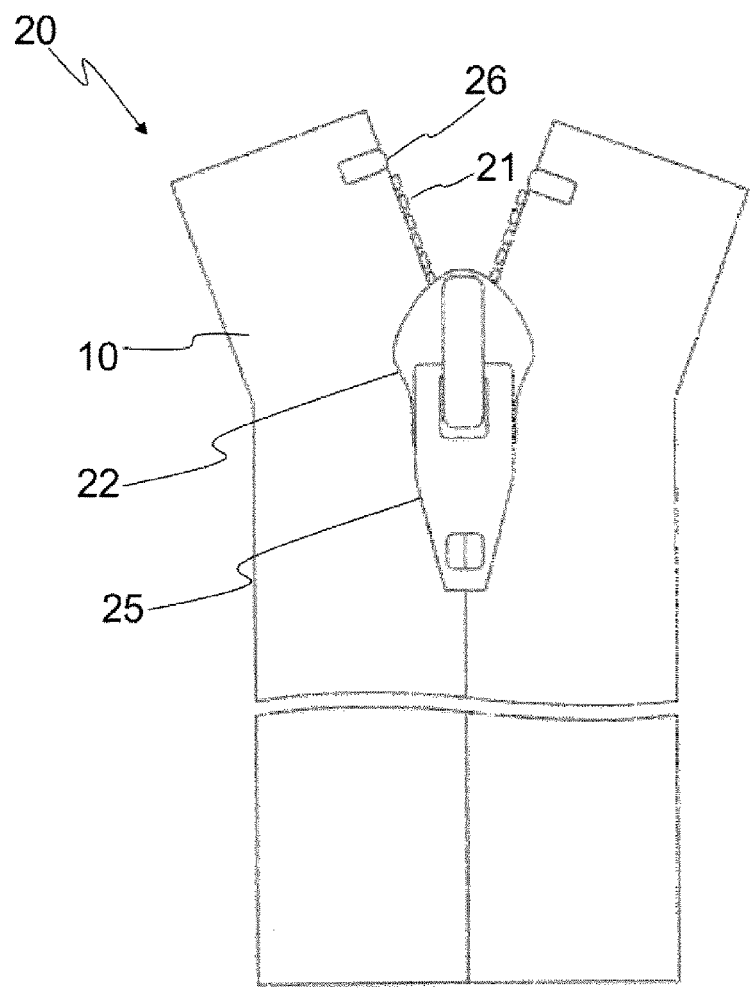
FIG. 2 is a plan view of a slide fastener according to an embodiment of the present invention.
Figure 3:
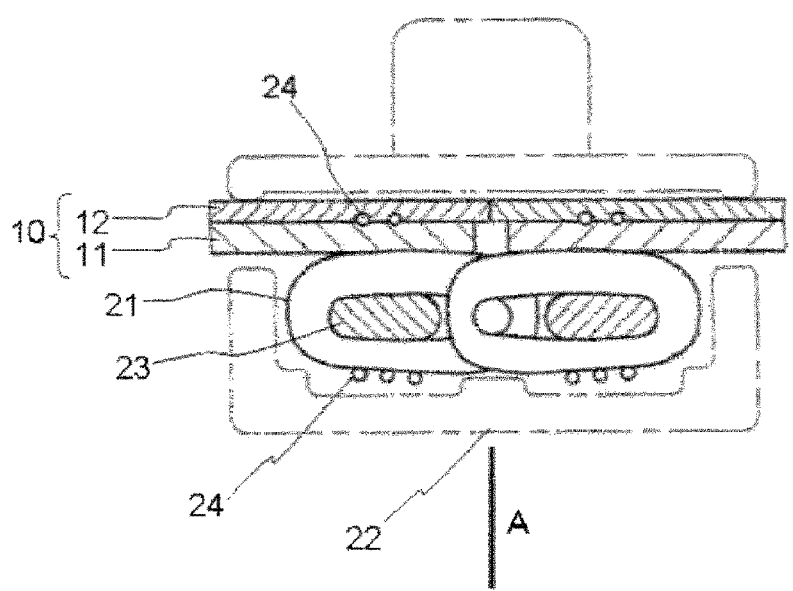
FIG. 3 is a cross sectional view of a slide fastener according to an embodiment of the present invention.
Figure 4:
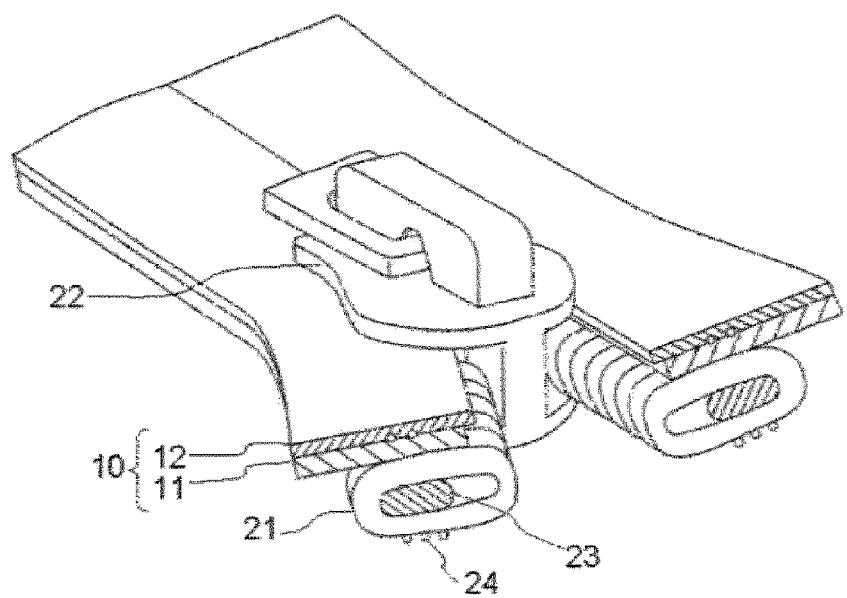
FIG. 4 is a perspective cross sectional view of a slide fastener according to an embodiment of the present invention.

FIGS. 2-4 show an example of a waterproof slide fastener 20 comprising the fastener tape of the present invention. FIG. 2 is a plan view of the whole waterproof slide fastener 20, FIG. 3 is a cross sectional view showing the state in which a pair of the element rows 21 engage with each other within the slider 22, and FIG. 4 is a perspective cross sectional view of a part of the waterproof slide fastener 20. A linear type coiled fastener element row 21 with a core string 23 inserted therein is sewn with a sewing thread 24 in double chain stitch by a sewing machine on the one surface of the base fabric 11 of each fastener tape 10 along the side edge thereof. The coiled fastener element row 21 can be formed of a monofilament of a synthetic resin, such as polyamide or polyester. The water-stop films 12 on a pair of the fastener tapes 10 can be bonded to a fabric of an article via an adhesive. Alternatively, the water-stop films 12 and the fabric can be welded to each other by high-frequency and also can be sewn to each other. The slider is inserted between the bilateral element rows, and opening/closing states of the slide fastener can be controlled by sliding the slider. The sewing thread 24 may be water-repellent finished.

When the water-stop films 12 are protruded from the side edges of the base fabric 11 toward the center line A of engagement between the element rows, respectively, the bilateral water-stop films 12 are easily brought into close contact with each other, thereby enhancing waterproof property. When the side edges of the water-stop films 12 are protruded so as to slightly exceed the center line A of engagement between the element rows, respectively, the bilateral water-stop films 12 are brought into close contact with each other upon engaging the bilateral element rows, thereby being able to obtain higher waterproof property.

When the slide fastener 20 according to the embodiment of the present invention is used, it is preferred to attach the slide fastener 20 to the object so as to make the side to which the water-stop film 12 is laminated the outer surface and so as to make the side of the fastener element rows 21 the inner surface. A pull tab 25 of the slider 22 can be attached to the outer surface side. In addition, top end stops 26 can be provided as shown in FIG. 2, and bottom end stops, a separable retainer and the like also can be attached though not shown in FIG. 2.

Figure 5:
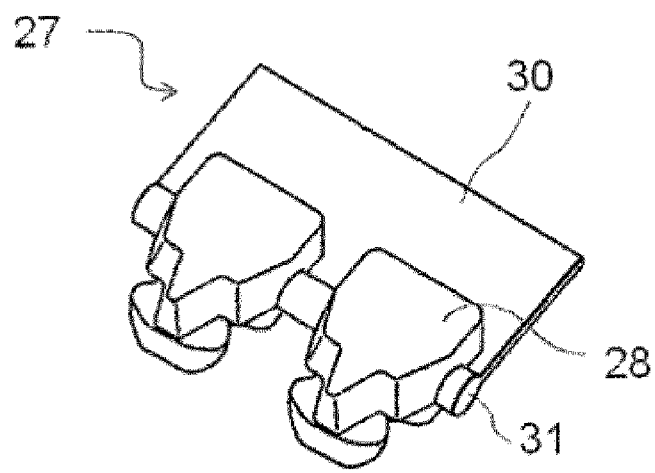
FIG. 5 is a perspective view of a fastener stringer composing a slide fastener according to an embodiment of the present invention.
Figure 6:
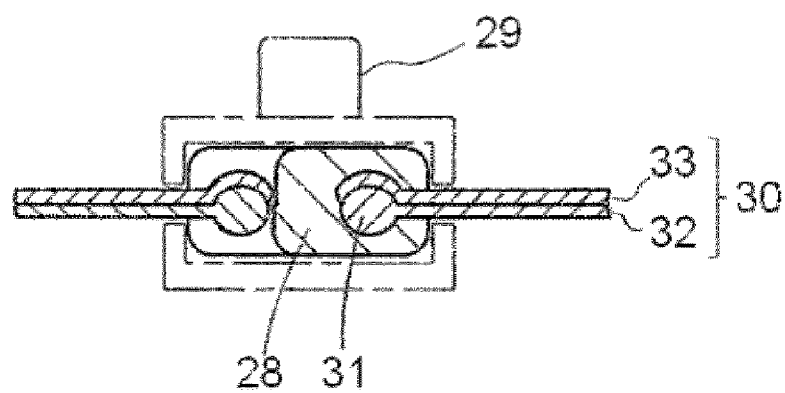
FIG. 6 is a cross sectional view of the slide fastener according to FIG. 5.

In addition, FIGS. 5 and 6 show partial schematic diagrams of a waterproof slide fastener according to another embodiment of the present invention. Specifically, FIG. 5 shows a part of a fastener stringer 27 composing a waterproof slide fastener according to the present embodiment, and FIG. 6 is a cross sectional view virtually showing a state in which bilateral fastener elements 28 engage with each other within a slider 29 in the slide fastener according to the present embodiment.

In the present embodiment, as shown in FIGS. 5 and 6, the fastener elements 28 are injection molded so as to clamp the whole of a core part 31 formed at the edge of a fastener tape 30 from the front and rear faces. A slider 29 is indicated by a virtual line in a dashed line. The fastener tape 30 is formed by laminating a water-stop film 33 on an outer surface of a base fabric 32. Then, as shown in FIG. 6, a tip of each fastener element 28 of one side (the tip facing the fastener tape of the other side) is brought into close contact with the fastener tape 30 of the other side during engagement, whereby waterproof property is exerted.

EXAMPLES

Hereinafter, Examples will be presented in order for a better understanding of the present invention and advantages thereof, and the present invention is not limited to these Examples.
(Materials Used)

The materials used in Examples described below are as follows. For the solvents used in each Example, environmental assessment was performed in terms of existence of suspected carcinogenic substances in the PRTR Law, other substances covered by the PRTR Law, and substances specified by the VOC regulation, and the results are summarized in Table 2.
(A) Aqueous Polyurethanes A-1: Resamine D (Produced by Dainichiseika Color & Chemicals Mfg. Co., Ltd.)

Resamine D is a water dispersion of a polycarbonate-based polyurethane and the polyurethane has an anionic group such as carboxyl group in the side chain.

A-2: A Silicone Compound-Added Material Based on Resamine D (Produced by Dainichiseika Color & Chemicals Mfg. Co., Ltd.)

A silicone compound was added to Resamine D so that the silicone compound concentration in the surface layer (in terms of solid) was that described in Table 1. At least a part of the silicone compound added is present in the state of being copolymerized with the polycarbonate-based polyurethane.
(B) Organic Solvent-Borne Polyurethanes B-1: A Silicone Compound-Added Material Based on Resamine NE (Produced by Dainichiseika Color & Chemicals Mfg. Co., Ltd.)
(Product Description)

Resamine NE is a solution of a polycarbonate-based polyurethane in an organic solvent, and a urethane film excellent in durability is formed by evaporating the organic solvent. As the organic solvent, two types, i.e., a DMF-based type and a butyl acetate-glycol ether type, were used. The types of the organic solvents are described in Table 1.

In addition, a silicone compound was added to Resamine NE so that the silicone compound concentration in the surface layer (in terms of solid) was that described in the Table 1. At least a part of the silicone compound added is present in the state of being copolymerized with the polycarbonate-based polyurethane.

B-2: Resamine UD (Produced by Dainichiseika Color & Chemicals Mfg. Co., Ltd.)
(Product Description)

Resamine UD is a solution in which a polycarbonate-based polyurethane is dissolved in a mixed solvent of toluene, methylethylketone (MEK) and ethyl acetate. Addition of a curing agent to the solution results in formation of an adhesive having a three-dimensional structure and excellent in adhesiveness.

B-3: Nipporan 5000 (Produced by Nippon Polyurethane Industry Co. Ltd.)
(Product Description)

Nipporan 5000 is a solution of a polycarbonate-based polyurethane in a DMF-based organic solvent. A urethane film can be formed by evaporating the organic solvent. Addition of a curing agent to the resin solution results in formation of an adhesive having a three-dimensional structure.

B-4: A Silicone Compound-Added Material Based on Nipporan 5000 (Produced by Nippon Polyurethane Industry Co. Ltd.)
(Product Description)

A silicone compound was added to Nipporan 5000 so that the silicone compound concentration in the surface layer (in terms of solid) was that described in the Table 1. At least a part of the silicone compound added is present in the state of being copolymerized with the polycarbonate-based polyurethane.
(C) Isocyanate (Curing Agent)

An aliphatic isocyanate in a glycol ether-based solvent

Each fastener tape was fabricated using the materials described above by the following procedure:

The material described in the column of "Surface layer" in Table 1 (in the case of two or more materials, a mixture thereof was used) was applied on a release film and dried to give a skin film having a thickness of approximately 0.02-0.10 mm.

Subsequently, the material described in the column of "Adhesive layer" in Table 1 and a thickener were mixed in proper quantities, the mixture was applied to the surface of the skin film with a thickness of approximately 0.02-0.20 mm, and then a fastener tape of a base fabric woven from a yarn made of polyester was laminated thereon by heating and pressurizing with a roller. Then, an accelerated curing reaction was performed at curing temperature of 40-60° C. for 48 hours or more. In this way, a fastener tape with a water-stop film laminated was fabricated.

It is noted that a fastener tape not containing a silicone compound in the surface layer was also fabricated separately in each Example.

In addition, welding peeling strength was determined according to the JIS standard in order to confirm compatibility of each fastener tape with the adhesive (for sewing) which is attached to clothing and the like. As the test samples, a waterproof slide fastener having a length of 100 mm and a polyester-based polyurethane hot melt adhesive MF200T-AH (Produced by Nisshinbo Chemical Inc.) having the same width as that of the waterproof slide fastener and a length of 60 mm were provided. The fabric and the fastener tape were laminated by a hot press machine under the conditions of 150° C. for 20 sec at 3.5 bar with the surface of the water-stop film side being the bonding surface, 180° peeling test (JIS K6854-3) was performed using Instron tensile testing machine under the conditions of tensile rate of 50 mm/min, and evaluation was performed by checking whether the tensile force during peeling exceeds the predetermined value or not. The case where the tensile force was less than 15 N per 1 cm (the dimension in the width direction of the slide fastener) was evaluated as "bad" and the case where the tensile force was 15 N or more was evaluated as "good", and those test results are as shown in Table 3. From those results, it has been found that when an aqueous type polyurethane was used as the surface layer of the skin film, peeling occurs.

Further, a waterproof slide fastener as shown in FIG. 2 was fabricated using each fastener tape, was subjected to the durability test against reciprocating opening and closing with 500 or 1000 times sliding of the slider, and then existence of disorder in the appearance of the skin film (peeling of the skin film) was visually confirmed. The moving distance of the slider per sliding of the slider was 50 mm. Evaluation thereof was performed as follows: after the test, the case where disorder was clearly confirmed visually was regarded as "bad", the case where almost no disorder was confirmed but some points which may be evaluated as disorder were seen partly was regarded as "fair", and the case where absolutely no disorder was confirmed was regarded as "good", and these test results were as shown in Table 4.

TABLE 1

| Example 1 (comparative) | Product name | Main component | Addition of silicone |
|---|---|---|---|
| Surface layer | B-1: RESAMINE NE (DAINICHISEIKA COLOR & CHEMICALS MFG. CO., LTD.) (DMF-based organic solvent) | Polyurethane | Yes (2-4% by mass) |
| Adhesive layer | B-2: RESAMINE UD (DAINICHISEIKA COLOR & CHEMICALS MFG. CO., LTD.) (mixed solvent of toluene-MEK-ethyl acetate) | Polyurethane | No |
| | Curing agent (mass ratio of curing agent to base resin = 12-15) (in terms of solid) | Aliphatic isocyanate | — |

| Example 2 | Product name | Main component | Addition of silicone |
|---|---|---|---|
| Surface layer | A-2: RESAMINE D (DAINICHISEIKA COLOR & CHEMICALS MFG. CO., LTD.) (water dispersion) | Polyurethane | Yes (2-4% by mass) |
| Adhesive layer | A-1: RESAMINE D (DAINICHISEIKA COLOR & CHEMICALS MFG. CO., LTD.) (water dispersion) | Polyurethane | No |
| | Curinq agent (mass ratio of curing agent to base resin = 12-15) (in terms of solid) | Aliphatic isocyanate | — |

| Example 3 | Product name | Main component | Inclusion of silicone |
|---|---|---|---|
| Surface layer | B-1: RESAMINE NE (DAINICHISEIKA COLOR & CHEMICALS MFG. CO., LTD.) (DMF-based organic solvent) | Polyurethane | Yes (2-4% by mass) |
| Adhesive layer | A-1: RESAMINE D (DAINICHISEIKA COLOR & CHEMICALS MFG. CO., LTD.) (water dispersion) | Polyurethane | No |
| | Curing agent (mass ratio of curing agent to base resin = 12-15) (in terms of solid) | Aliphatic isocyanate | — |

| Example 4 | Product name | Main component | Inclusion of silicone |
|---|---|---|---|
| Surface layer | B-1: RESAMINE NE (DAINICHISEIKA COLOR & CHEMICALS MFG. CO., LTD.) (butyl acetate-glycol ether based) | Polyurethane | Yes (4-15% by mass) |
| | Curing agent (mass ratio of curing agent to base resin = 12-15) (in terms of solid) | Aliphatic isocyanate | — |
| Adhesive layer | A-1: RESAMINE D (DAINICHISEIKA COLOR & CHEMICALS MFG. CO., LTD.) (water dispersion) | Polyurethane | No |
| | Curinq agent (mass ratio of curing agent to base resin = 12-15) (in terms of solid) | Aliphatic isocyanate | — |

| Example 5 (comparative) | Product name | Main component | Inclusion of silicone |
|---|---|---|---|
| Surface layer | B-1: RESAMINE NE (DAINICHISEIKA COLOR & CHEMICALS MFG. CO., LTD.) (butyl acetate-glycol ether based) | Polyurethane | Yes (4-15% by mass) |
| | Curing agent (mass ratio of curing agent to base resin = 12-15) (in terms of solid) | Aliphatic isocyanate | — |
| Adhesive layer | B-2: RESAMINE UD (DAINICHISEIKA COLOR & CHEMICALS MFG. CO., LTD.) (mixed solvent of toluene-MEK-ethyl | Polyurethane | No |

TABLE 1-continued

| | acetate) | | |
|---|---|---|---|
| | Curing agent (mass ratio of curing agent to base resin = 12-15) (in terms of solid) | Aliphatic isocyanate | — |

| Example 6 (comparative) | Product name | Main component | Inclusion of silicone |
|---|---|---|---|
| Surface layer | B-4: Nipporan 5000 (Nippon Polyurethane Industry Co. Ltd.) (DMF-based organic solvent) | Polyurethane | Yes (2-4% by mass) |
| Adhesive layer | B-3: Nipporan 5000 (Nippon Polyurethane Industry Co. Ltd.) (DMF-based organic solvent) | Polyurethane | No |
| | Curing agent (mass ratio of curing agent to base resin = 12-15) (in terms of solid) | Aliphatic isocyanate | — |

| Example 7 | Product name | Main component | Inclusion of silicone |
|---|---|---|---|
| Surface layer | B-4: Nipporan 5000 (Nippon Polyurethane Industry Co. Ltd.) (DMF-based organic solvent) | Polyurethane | Yes (2-4% by mass) |
| Adhesive layer | A-1: RESAMINE D (DAINICHISEIKA COLOR & CHEMICALS MFG. CO., LTD.) (water dispersion) | Polyurethane | No |
| | Curing agent (mass ratio of curing agent to base resin = 12-15) (in terms of solid) | Aliphatic isocyanate | — |

TABLE 2

| | | Example 1 | Example 2 | Example 3 | Example 4 | Example 5 | Example 6 | Example 7 |
|---|---|---|---|---|---|---|---|---|
| Surface layer | | DMF-based organic solvent | Aqueous | DMF-based organic solvent | non-DMF-based organic solvent | non-DMF-based organic solvent | DMF-based organic solvent | DMF-based organic solvent |
| Adhesive layer | | Solvent-based | Aqueous | Aqueous | Aqueous | Solvent-based | Solvent-based | Aqueous |
| Substance covered by the PRTR Law Class 1 | Suspected carcinogenic substance | Yes | No | Yes | No | No | Yes | Yes |
| | Others | Yes | No | No | No | Yes | Yes | No |
| VOC substance not covered by the PRTR Law | | Yes | Trace | Yes | Yes | Yes | Yes | Yes |
| Evaluation | | bad | good | fair | good | fair | bad | fair |

TABLE 3

| | | Example 1 | | Example 2 | | Example 3 | | Example 4 | | Example 5 | | Example 6 | | Example 7 | |
|---|---|---|---|---|---|---|---|---|---|---|---|---|---|---|---|
| Attachment to fabric of clothing etc. | Inclusion of silicone in surface layer | Yes | No | Yes | No | Yes | No | Yes | No | Yes | No | Yes | No | Yes | No |
| | Adhesion with polyester-based polyurethane adhesive | good | good | bad | bad | good | good | good | good | good | good | good | good | good | good |

TABLE 4

| | | Example 1 | | Example 2 | | Example 3 | | Example 4 | | Example 5 | | Example 6 | | Example 7 | |
|---|---|---|---|---|---|---|---|---|---|---|---|---|---|---|---|
| Durability test against reciprocating opening and closing by sliding slider | Inclusion of silicone in surface layer | Yes | No | Yes | No | Yes | No | Yes | No | Yes | No | Yes | No | Yes | No |
| | 500 times sliding | good | good | good | good | good | fair | good | good | good | good | good | good | good | good |
| | 1000 times sliding | good | bad | bad | bad | good | bad | good | bad | good | bad | good | bad | good | bad |

(Discussion)

Comprehensive evaluation was carried out through weighting to the evaluation items described in Table 2, Table 3 and Table 4 in the order of those described in Table 2, Table 4, and Table 3 in view of the purpose of the present invention, and the results are shown in Table 5.

Accordingly, Examples for which environmental assessment (Table 2), among those evaluation items, was "bad" were comprehensively evaluated as "bad" regardless of the evaluation results for other items. It is noted that the environmental assessment is evaluation for the environmental burden and "high influences" refer to high (large) environmental burden in the description below. On the other hand, "low influences" refer to low (small) environmental burden.

With regard to the durability test against reciprocating opening and closing (Table 4), when an Example can withstand the 500 times reciprocation test, the Example can be judged as being practical.

The reason why the peeling strength (Table 3) was most lightly weighted is that fasteners are practically attached to fabric by sewing, and therefore, a fastener can be attached even when this evaluation therefor is "bad". Accordingly, the comprehensive evaluation is not necessarily "bad" even when the peeling strength evaluation is "bad".

The comprehensive evaluation was performed based on the criteria below:

"bad": Use of it is not preferred because of a significant restriction on use.

For Example 4, the environmental assessment was "good" and Example 4 containing the silicone was evaluated as "good" also for all other items, and therefore, was comprehensively evaluated as "very good". Example 4 without the silicone was comprehensively evaluated as "good" since the durability against sliding did not exceed 1000 times.

For Example 5 (comparative), although the environmental assessment was "fair" and the environmental influences are lower than those for Example 1, the adhesive layer also used an organic solvent, and therefore, the environmental influences are higher than those for Example 3. Thus, Example 5 containing the silicone was comprehensively evaluated as "bad" in spite of the evaluation as "good" for the peeling strength and also the durability against sliding. Example 5 without the silicone was comprehensively evaluated as "bad" since the durability against sliding did not exceed 1000 times.

Example 6 (comparative), regardless of existence of the silicone, was evaluated as "bad" in the environmental assessment, and therefore, was also comprehensively evaluated as "bad".

For Example 7, although the environmental assessment was "fair", the aqueous material was used in the adhesive layer and the environmental influences are lower than those for Example 1. Example 7 containing the silicone was evaluated as "good" in terms of the peeling strength and also the durability against sliding, and therefore, was comprehensively evaluated as "good". Example 7 without the silicone was comprehensively evaluated as "fair" since the durability against sliding did not exceed 1000 times in spite of the sufficient peeling strength.

TABLE 5

|  | Example 1 | | Example 2 | | Example 3 | | Example 4 | | Example 5 | | Example 6 | | Example 7 | |
| --- | --- | --- | --- | --- | --- | --- | --- | --- | --- | --- | --- | --- | --- | --- |
| Inclusion of silicone in surface layer | Yes | No | Yes | No | Yes | No | Yes | No | Yes | No | Yes | No | Yes | No |
| Comprehensive evaluation | bad | bad | good | fair | good | fair | very good | good | bad | bad | bad | bad | good | fair |

"fair": It is usable, while there are some restrictions on use, under the condition of observing the use and the restriction.

"good": It is usable since there is almost no restriction on use.

"very good": It is usable without any restriction on use.

Example 1 (comparative), regardless of existence of the silicone, had high environmental influences and was evaluated as "bad" in the environmental assessment, and therefore, was also comprehensively evaluated as "bad".

For Example 2, the environmental assessment was "good", and the peeling strength was "bad" but there is no problem when employing attachment by common sewing. However, considering the evaluation for durability against sliding, Example 2 containing the silicone was comprehensively evaluated as "good" and Example 2 without the silicone was comprehensively evaluated as "fair".

For Example 3, although the environmental assessment was "fair", the aqueous material was used in the adhesive layer and the environmental influences are lower than those for Example 1. Example 3 containing the silicone was evaluated as "good" in terms of the peeling strength and also the durability against sliding, and therefore, was comprehensively evaluated as "good". Example 3 without the silicone was comprehensively evaluated as "fair" since the durability against sliding did not exceed 1000 times in spite of the sufficient peeling strength.

REFERENCE SIGNS LIST

10 Fastener tape
11 Base fabric
12 Water-stop film
13 Surface layer
14 Adhesive layer
20 Waterproof slide fastener
21 Element row
22 Slider
23 Core string
24 Sewing thread
25 Pull tab
26 Top end stop
27 Fastener stringer
28 Fastener element
29 Slider
30 Fastener tape
31 Core part
32 Base fabric
33 Water-stop film

The invention claimed is:

1. A slide fastener comprising a fastener tape, wherein the fastener tape comprises:
   a base fabric; a waterproof surface layer comprising polyurethane; and a waterproof adhesive layer comprising a cured product of an aqueous polyurethane adhesive, and wherein the waterproof adhesive layer is between the base fabric and the waterproof surface layer so that the fastener tape has a laminate structure, wherein the waterproof surface layer comprises a water-soluble organic solvent-borne polyurethane, a water-soluble organic solvent of the water-soluble organic solvent-borne polyurethane comprises one or more selected from the group consisting of glycol ethers, alcohols, terpenes, and pyrrolidones, wherein the waterproof surface layer comprises a silicone compound, wherein the waterproof adhesive layer does not comprise a silicone compound, and wherein the cured product of the aqueous polyurethane adhesive comprises a carboxyl group and/or a neutralized carboxyl group.

2. The slide fastener according to claim 1, wherein both the waterproof surface layer and the waterproof adhesive layer comprise a polycarbonate polyurethane.

3. The slide fastener according to claim 1, wherein the content of the silicone compound in the surface layer is in the range of 2% to 25% by mass.

4. The slide fastener according to claim 3, wherein the content of the silicone compound in the surface layer is in the range of 4% to 15% by mass.

5. A method for fabricating the fastener tape included in the slide fastener according to claim 1, the method comprising the steps of:

laminating the waterproof surface layer and the base fabric via the aqueous polyurethane adhesive; and curing the aqueous polyurethane adhesive between the waterproof surface layer and the base fabric.

6. The slide fastener according to claim 1, wherein the water-soluble organic solvent of the water-soluble organic solvent-borne polyurethane is a mixture of butyl and acetate-glycol ether.

* * * * *